United States Patent [19]

Mead

[11] Patent Number: 4,701,293
[45] Date of Patent: Oct. 20, 1987

[54] MOLDING PROCESS AND APPARATUS UTILIZING MEMORY METAL ALLOY SPRINGS

[75] Inventor: Albert R. Mead, Setauket, N.Y.

[73] Assignee: Grumman Aerospace Corporation, Bethpage, N.Y.

[21] Appl. No.: 779,767

[22] Filed: Sep. 24, 1985

[51] Int. Cl.⁴ .................. B29C 33/02; B30B 1/00; B31F 1/00; D21J 3/12
[52] U.S. Cl. ..................... 264/258; 100/93 P; 264/320; 264/324; 264/325; 264/334; 425/384; 425/395; 425/398; 425/407; 425/419
[58] Field of Search ............. 264/258, 324, 257, 319, 264/320, 325, 334; 425/384, 394, 407, 395, 398, 419; 156/221, 222, 307.1, 307.3, 307.4, 308.2, 580, 583.1; 100/93 P

[56] References Cited

U.S. PATENT DOCUMENTS

| | | |
|---|---|---|
| 2,585,818 | 2/1952 | Moravec . |
| 2,874,751 | 2/1959 | Norton . |
| 2,907,937 | 10/1959 | Apgar et al. . |
| 2,990,583 | 7/1961 | Barbera . |
| 3,287,486 | 11/1966 | Jurgeleit et al. ............ 264/325 |
| 3,748,108 | 7/1973 | Rothwarf et al. . |

Primary Examiner—Jeffery Thurlow
Assistant Examiner—Leo B. Tentoni
Attorney, Agent, or Firm—Pollock, VandeSande & Priddy

[57] ABSTRACT

A number of distributed springs, fabricated from memory metal alloy, are connected to a die in a molding assembly. When heat is applied to the springs, they expand with sufficient force to mold a resin-impregnated composite material over a contoured mold form. The heat may be simultaneously applied to the composite material for achieving curing while molding occurs. Upon removal of the heat, the springs contract thereby allowing removal of a finished molded product.

7 Claims, 2 Drawing Figures

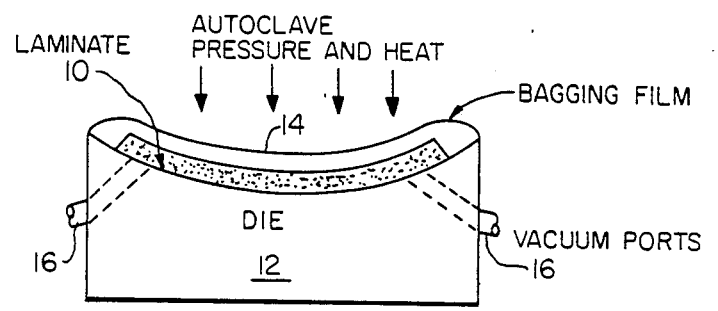
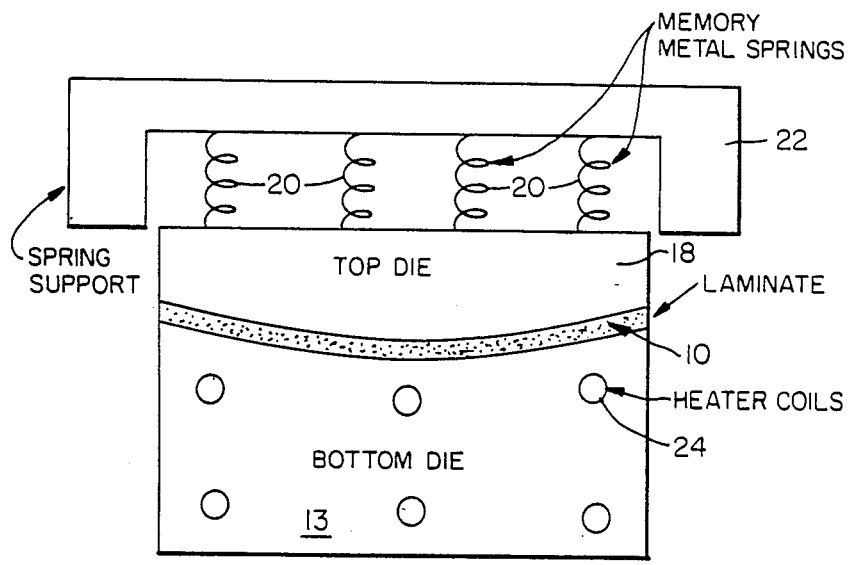

MOLDING PROCESS AND APPARATUS UTILIZING MEMORY METAL ALLOY SPRINGS

FIELD OF THE INVENTION

The present invention relates to molding apparatus, and more particularly to a memory metal spring assembly for exerting pressure between two confronting dies of a molding apparatus.

BACKGROUND OF THE INVENTION

In forming a wide variety of laminated structures, significant pressure must be exerted upon individual layers or sheets of a laminate while heat is applied to cure the bonding material between layers.

In the aircraft industry, autoclaves are conventionally used to mold composite laminated structures such as graphite/epoxy fibers which are employed to form panels for the exterior skin of an aircraft.

FIG. 1 shows a typical simplified schematic illustration of a molding apparatus for such a laminate. The laminate 10 is built up from layers of composite fiber material, such as preimpregnated graphite/epoxy, or other resin-reinforced composite material of the type conventionally available from CIBA-GEIGY Corporation or Hercules Corporation. The preimpregnated fabric layers are built up over a lower die 12, and a bagging film 14 is positioned over the laminate and die 12. In order to complete bonding between the layers of laminate 10, an autoclave (not shown) exerts substantial pressure against the laminate, via the bagging film, and the laminate is simultaneously subjected to heat. Vacuum ports 16 are provided in the die 12 to evacuate the volume beneath the bagging film 14 thereby allowing contraction of the bagging film and pressure transmission to the laminate 10. After a prescribed curing-bonding period, the bagging film is removed to allow removal of a molded laminate 10 that has the shape of die 12.

Although this prior art approach operates satisfactorily, it requires the use of an autoclave which is an extremely expensive piece of equipment. As a result, a manufactured laminate 10 is costly to manufacture. In addition, a time-consuming process is required for removing the bagging film and cleaning up die 12.

BRIEF DESCRIPTION OF THE PRESENT INVENTION

The present invention eliminates the costly use of an autoclave by subjecting a molding laminate to pressure exerted by memory metal alloy springs. These springs are fabricated from available memory metal alloys and are capable of expansion and contraction over a wider dimensional and force range than typical spring metals. By using a series of these springs to force two molding die members against a laminate being molded, an inexpensive means for generating molding forces may be realized. The curing temperatures necessary to form a completed laminate are obtained by heating one of the molding dies by means such as embedded heating coils.

As a result of the present invention, a significant reduction in manufacturing costs for molded laminates may be realized.

The above-mentioned objects and advantages of the present invention will be more clearly understood when considered in conjunction with the accompanying drawings, in which:

BRIEF DESCRIPTION OF THE FIGURES

FIG. 1 is a schematic representation of a molding apparatus utilized in connection with the prior art.

FIG. 2 is a schematic representation of a molding apparatus including the memory metal alloy springs of the present invention.

DETAILED DESCRIPTION OF THE INVENTION

Referring to FIG. 2, a molding apparatus in accordance with the present invention (shown in simplified form) indicates the disposition of a laminated structure 10, as previously described, between a top die 18 and a bottom die 13. The bagging film of the prior art arrangement is replaced by top die 18.

In order to exert downward pressure on top die 18, a plurality of spaced memory metal springs 20 is employed, the springs being fabricated from memory metal alloys. The springs themselves constitute prior art as evidenced by U.S. Pat. No. 3,748,108 issued to Rothwarf, et al., on July 24, 1973. Springs of the type used in the present invention are also available from Memory Metals, Inc., of Stamford, Conn. A spring support 22 secures the upper ends of springs 20 and conventional tie-down straps (not shown) would normally be employed to position the springs in an initially biased condition. Heater coils 24 are embedded within bottom die 13 and these coils may be of the electrical type. Heat generated by the coils performs two functions simultaneously. First, they cause expansion of springs 20 to force top die 18 toward bottom die 13. Also, the heat from the coils causes simultaneous curing of the bonding material, such as resins, in laminate 10. After a sufficient curing/molding time has passed, the heater coils are de-energized and springs 20 contract. As a result, top die 18 becomes raised allowing removal of a finished laminate 10. The present invention may be utilized for advanced composite laminate materials such as the graphite/epoxy described heretofore, or other resins/reinforced composites which now require autoclave processing.

The invention is also applicable to adhesively bonded structures utilizing metal-to-metal configurations or aircraft skin-to-honeycomb configurations.

Further utilization of the invention is for creep-forming structural parts which now require vacuum, mechanical or gravitational-generated loads in order to supply the necessary force to bring about required forming.

By virtue of the foregoing discussion, it will be appreciated that the present invention offers an improved alternative to many laminate-producing processes which previously required the expensive and time-consuming use of an autoclave.

It should be understood that the invention is not limited to the exact details of construction shown and described herein, for obvious modifications will occur to persons skilled in the art.

I claim:

1. A molding apparatus comprising:
   a first die upon which a first surface of a moldable material is placed;
   a second die for contacting an opposite surface of the material;
   at least one spring fabricated of a memory metal alloy and connected to the second die; and means for heating the spring to expand it and move the second die thereby generating sufficient force of the second die to mold the article, wherein de-energizing the heating means causes spring contraction and linked displacement of the second die from the material for enabling removal of the material after it has been molded.

2. A molding apparatus comprising:

a first die upon which a first exposed surface of laminate sheets are placed;

a second die for contacting an opposite exposed surface of the sheets;

at least one spring fabricated of memory metal alloy and connected to the second die; and means for applying heat to the laminate sheets and the spring for simultaneously curing bonding material which impregnates the sheets and expanding the spring to move the second die consequently generating sufficient force on the second die to mold the article.

3. The structure set forth in claim 2 together with means mounted in spaced relation to the second die for supporting the spring.

4. The structure set forth in claim 2 wherein the heating means comprises heating coils embedded within the first die.

5. The structure set forth in claim 3 wherein a plurality of evenly spaced springs are mounted between the supporting means and the second die.

6. A method for molding material comprising the steps:

positioning the material on a first die;

positioning a second die in spaced relation to the first die for molding the material therebetween;

mounting springs of memory metal alloy to the second die;

applying heat to the springs to expand them and move the second die thereby generating sufficient force on the second die to mold the article; and cooling the springs for contracting them and consequently displacing the second die thus permitting removal of molded material.

7. The method set forth in claim 6 wherein the material is comprised of overlying sheets of resin-impregnated fabric, and further wherein application of heat simultaneously cures the resin to form a molded composite laminate.

* * * * *